United States Patent [19]

Miller

[11] Patent Number: 5,920,949
[45] Date of Patent: Jul. 13, 1999

[54] ROCKING WIPER MECHANISM

[75] Inventor: Robin Mihekun Miller, Ellington, Conn.

[73] Assignee: UT Automotive Dearborn, Inc., Dearborn, Mich.

[21] Appl. No.: 08/948,171

[22] Filed: Oct. 9, 1997

Related U.S. Application Data

[51] Int. Cl.$^6$ ...................................................... B60S 1/40
[52] U.S. Cl. ................................... 15/250.23; 15/250.32; 15/250.361
[58] Field of Search ........................ 15/250.23, 250.32, 15/250.21, 250.361; 134/6

[56] References Cited

U.S. PATENT DOCUMENTS

| | | | |
|---|---|---|---|
| 1,727,456 | 9/1929 | Uddenborg | 15/250.23 |
| 2,587,168 | 2/1952 | Kessler | 15/250.23 |
| 2,615,945 | 10/1952 | Jaeschke . | |

(List continued on next page.)

FOREIGN PATENT DOCUMENTS

| | | | |
|---|---|---|---|
| 0 345 002 A2 | 6/1989 | European Pat. Off. . | |
| 1104253 | 6/1955 | France | 15/250.23 |
| 2247897 | 5/1975 | France | 15/250.32 |
| 822 178 | 11/1951 | Germany . | |
| 1203144 | 10/1965 | Germany | 15/250.32 |
| 2305239 | 8/1973 | Germany | 15/250.23 |
| 2510416 | 9/1975 | Germany | 15/250.23 |
| 2415180 | 10/1975 | Germany | 15/250.32 |
| 28 16 207 A1 | 10/1979 | Germany . | |
| 3807087 A1 | 9/1989 | Germany . | |
| 39 23 688 A1 | 1/1991 | Germany . | |
| 43 13 363 A1 | 11/1993 | Germany . | |
| 43 37 760 A1 | 5/1994 | Germany . | |
| 56-22150 | 2/1981 | Japan . | |
| 5-86761 | 6/1993 | Japan . | |
| 2045066 | 10/1980 | United Kingdom | 15/250.32 |
| WO 96/33891 | 10/1996 | WIPO . | |
| WO 96/33892 | 10/1996 | WIPO . | |
| WO 96/33893 | 10/1996 | WIPO . | |

OTHER PUBLICATIONS

Patent Abstracts of Japan, vol. 016, 7–438 (M–1309), Sep. 11, 1992 for JP Patent Publication No. 04151351.
p. 100, *Machine Design*, 60 (1988) Oct. 13, No. 24, Cleveland, Ohio, US.
"Goodheart–Wilcox Automotive Encyclopedia", William K. Toboldt, Larry Johnson, Steven W. Olive, 1989, pp. 723–727.
"Automotive Handbook", Bosch 3rd Edition, 1993, pp. 694–697.
"Kinematic Analysis of Mechanisms", 1959, J.E. Shigley, pp. 228–231.
"Genevamation Indexing Drives", Jan. 12, 1995 Catalog No. 693, Geneva Mechanisms Corporation.
"Saab 900 Owners Workshop Manual", Haynes Publishing Group, 1979 through 1985, pp. 172–174, 237.
Machine Design, "Basics of Design Engineering", Jun. 1992, Article "Mechanical Systems".
A paper from the Third Conference on Mechanisms, "A Survey of Intermittent–Motion", F.J.Bogardus, 1956, pp. 8–15.
Machine Design, Mechanisms for Intermittent Motion, Dec. 1951, Otto Lichtwitz, pp. 134–148.
"Mechanisms for Providing Intermittent Rotary Motion", Product Engineering, Aug. 1949, pp. 116–117.

(List continued on next page.)

*Primary Examiner*—Gary K. Graham
*Attorney, Agent, or Firm*—Harness, Dickey & Pierce, P.L.C.

[57] ABSTRACT

A rocking wiper mechanism for achieving optimal surface clearance consists of a wiping blade secured in a rocking wiper bracket, a lost motion device connected to the rocking wiper bracket, and a rotating wiper arm driven by a drive output shaft. The lost motion device creates frictional movement between the wiping blade and the surface and allows a rocking motion between the rocking wiper bracket and the rotating wiper arm.

11 Claims, 3 Drawing Sheets

5,920,949
Page 2

U.S. PATENT DOCUMENTS

| | | | |
|---|---|---|---|
| 2,659,237 | 11/1953 | Wood . | |
| 2,722,617 | 11/1955 | Cluwen et al. . | |
| 2,821,735 | 2/1958 | Perkins et al. | 15/250.23 |
| 2,959,803 | 11/1960 | Ziegler . | |
| 3,361,005 | 1/1968 | Carpenter . | |
| 3,421,380 | 1/1969 | Mansour . | |
| 3,442,146 | 5/1969 | Simpson . | |
| 3,443,442 | 5/1969 | Schweihs . | |
| 3,443,455 | 5/1969 | Zugel . | |
| 3,453,679 | 7/1969 | Thorlakson | 15/250.23 |
| 3,466,694 | 9/1969 | Feldstein | 15/250.23 |
| 3,523,204 | 8/1970 | Rand . | |
| 3,574,882 | 4/1971 | Petry . | |
| 3,659,128 | 4/1972 | Danek . | |
| 3,660,862 | 5/1972 | Scinta | 15/250.23 |
| 3,665,772 | 5/1972 | Beard et al. . | |
| 3,670,355 | 6/1972 | Sakomoto | 15/250.32 |
| 3,688,332 | 9/1972 | Bellware . | |
| 3,689,817 | 9/1972 | Elliott . | |
| 3,694,723 | 9/1972 | Schneider et al. . | |
| 3,803,627 | 4/1974 | Schuscheng . | |
| 3,868,743 | 3/1975 | Kokizaki | 15/250.23 |
| 3,917,330 | 11/1975 | Quantz . | |
| 3,927,436 | 12/1975 | Inoue et al. . | |
| 4,009,952 | 3/1977 | Badalich et al. . | |
| 4,065,234 | 12/1977 | Yoshiyuki et al. . | |
| 4,158,159 | 6/1979 | Orris et al. . | |
| 4,173,055 | 11/1979 | Izumi et al. . | |
| 4,183,114 | 1/1980 | Eden . | |
| 4,208,759 | 6/1980 | Nixon et al. | 15/250.23 |
| 4,259,624 | 3/1981 | Seibicke . | |
| 4,271,381 | 6/1981 | Munz et al. . | |
| 4,309,646 | 1/1982 | Liedtke et al. . | |
| 4,336,482 | 6/1982 | Goertler et al. . | |
| 4,347,640 | 9/1982 | Durtnal | 15/250.32 |
| 4,352,299 | 10/1982 | Riggs et al. . | |
| 4,422,522 | 12/1983 | Slavin et al. . | |
| 4,434,678 | 3/1984 | Maus . | |
| 4,492,904 | 1/1985 | Graham . | |
| 4,507,711 | 3/1985 | Ono et al. . | |
| 4,553,656 | 11/1985 | Lense . | |
| 4,573,723 | 3/1986 | Morita et al. . | |
| 4,630,178 | 12/1986 | Mugford et al. . | |
| 4,639,065 | 1/1987 | Kohler et al. . | |
| 4,660,698 | 4/1987 | Miura . | |
| 4,674,781 | 6/1987 | Reece et al. . | |
| 4,702,117 | 10/1987 | Tsutsumi et al. . | |
| 4,733,147 | 3/1988 | Muller et al. . | |
| 4,875,053 | 10/1989 | Harada . | |
| 4,878,398 | 11/1989 | Heinrich . | |
| 4,885,512 | 12/1989 | Gille et al. . | |
| 4,893,039 | 1/1990 | Isii . | |
| 4,918,272 | 4/1990 | Nishikawa . | |
| 5,007,131 | 4/1991 | Chevalier et al. . | |
| 5,023,530 | 6/1991 | Ohashi et al. . | |
| 5,045,741 | 9/1991 | Dvorsky . | |
| 5,063,317 | 11/1991 | Bruhn . | |
| 5,182,597 | 2/1993 | Bohmer et al. . | |
| 5,214,440 | 5/1993 | Takahashi et al. . | |
| 5,218,255 | 6/1993 | Horiguchi . | |
| 5,222,775 | 6/1993 | Kato . | |
| 5,228,239 | 7/1993 | Heo . | |
| 5,251,114 | 10/1993 | Cantin et al. . | |
| 5,274,875 | 1/1994 | Chou . | |
| 5,291,109 | 3/1994 | Peter . | |
| 5,333,351 | 8/1994 | Sato . | |
| 5,355,061 | 10/1994 | Forhan . | |
| 5,355,286 | 10/1994 | Flint . | |
| 5,519,258 | 5/1996 | Stroven et al. . | |
| 5,691,586 | 11/1997 | Yonnet et al. . | |
| 5,694,812 | 12/1997 | Maue et al. . | |

OTHER PUBLICATIONS

Machine Design, "Mechanisms for Intermittent Motion, Part 2", Jan. 1952, Otto Lichtwitz, pp. 127–141.

Machine Design, "Mechanisms for Intermittent Motion, Part 3", Feb. 1952, Otto Lichtwitz, pp. 146–155.

Machine Design, "Mechanisms for Intermittent Motion, Part 4", Mar. 1952, Otto Lichtwitz, pp. 147–155.

A paper from the Third Conference on Mechanisms, "Designing for Intermittent Motion with Modified Starwheels", Karl E. Kist, pp. 16–20.

"Mechanisms for Engineering Design" "Motion, Circular, Intermittent", Chapter 3, S.B. Tuttle, John Wiley Co., pp. 33–51.

Machine Design, "Modifying Starwheel Mechanisms", Vandeman and Wood, April 1953, pp. 255–261.

"Kinematics of Intermittent Mechanism III—The Spherical Geneva Wheel", Product Engineering, Oct. 1949, S. Rappaport, pp. 137–139.

Machine Design, "Mechanical Systems", Jun. 1992, pp. 130, 132, 168.

"Mechanisms and Dynamics of Machinery", Hamilton H. Mabie and Fred W. Ocvirk, John Wiley & Sons, 1957.

A paper from the International Congress & Exposition, SAE Technical Paper Series 960390, "Liftgate Multiplexed Node", Feb., 1996, H. Winston Maue, pp. 73–76.

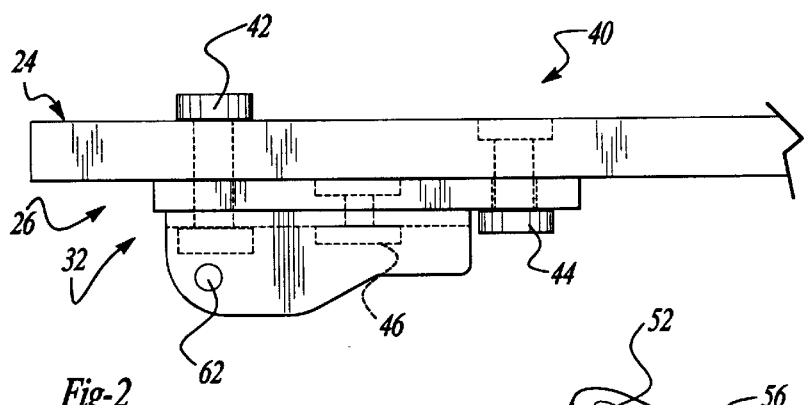
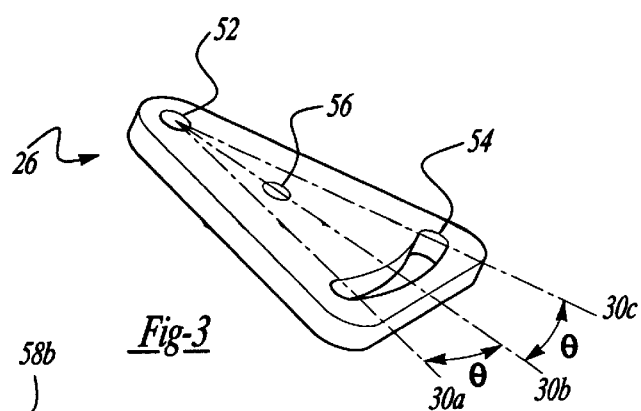
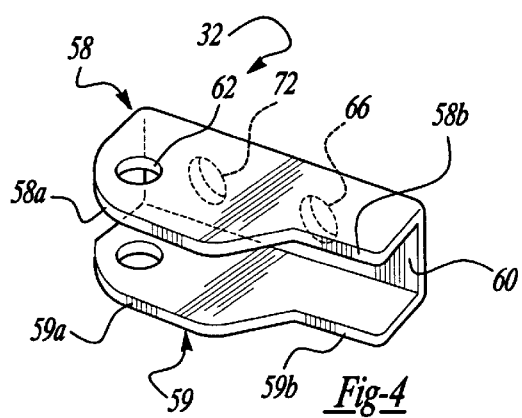
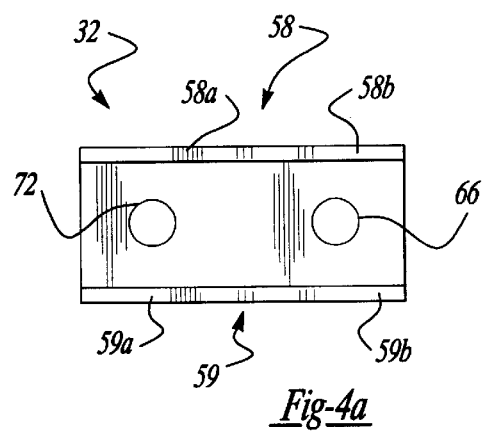
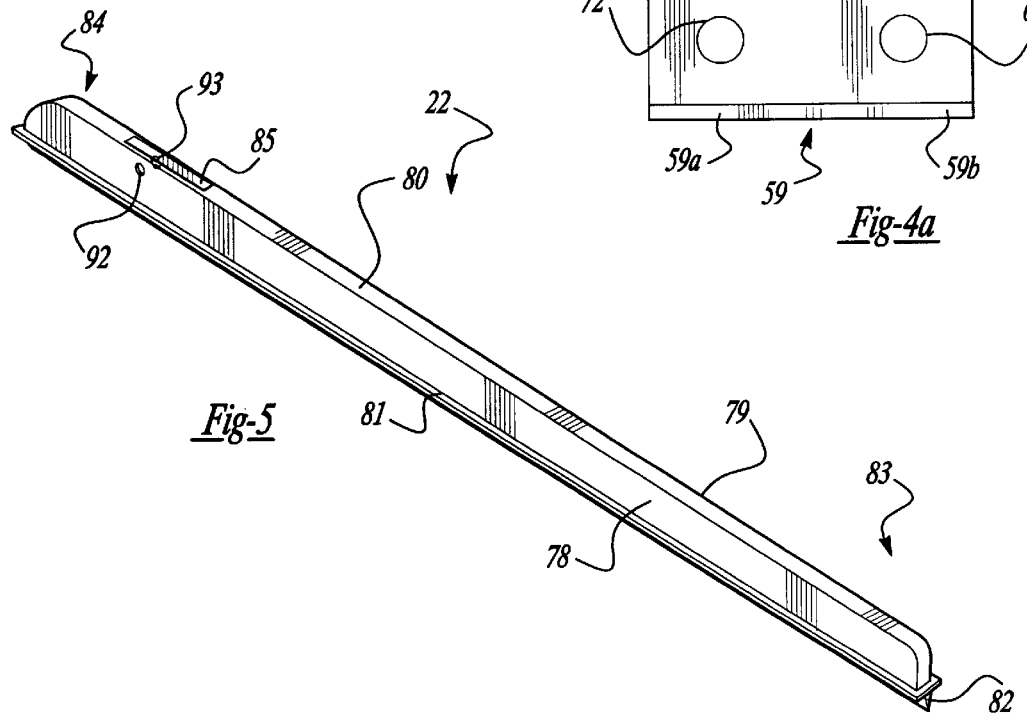

ROCKING WIPER MECHANISM

BACKGROUND OF THE INVENTION

This invention relates generally to a vehicle windshield wiper assembly and specifically to a rocking wiper mechanism for achieving full window clearance.

Vehicle windshield wiper assemblies, which clear rain and other visual obstructions from the windshield glass, are well known in the art. In the automotive industry, vehicle windshield wiper assemblies are considered standard equipment. Almost all automotive vehicles incorporate either a single windshield wiper assembly or a pair of windshield wiper assemblies. Traditionally, a vehicle windshield wiper assembly includes rubber wiper blades mounted on claw brackets, wiper arms attached to the claw brackets and rotating shafts for mounting the wiper arms. It is common in the art to drive the pair of rotating shafts either directly by electric motors or indirectly by a single electric motor that actuates series- or parallel-coupled four-bar linkage mechanisms.

It is also known in the art to employ a window wiper assembly for cleaning rear windows of automotive vehicles. A typical rear window wiper assembly includes a wiper blade mounted on a bracket, a wiper arm coupled to the bracket, a wiper shaft attached to the wiper arm, and a helical gear for rotably driving the wiper shaft in a cyclical oscillating manner. Usually, a reversible, fractional horsepower, direct current electric motor serves to actuate the helical gear through an armature shaft-mounted worm gear enmeshed therewith. A rear window wiper assembly of this type is typically mounted on a pivoting liftgate of a minivan, station wagon, sport-utility vehicle or the like.

Examples of conventional window wiper assemblies and motor mechanisms are disclosed in the following U.S. Pat. No. 5,519,258 entitled "System and Method for Controlling Vehicle Lift Gate Window Wiper" which issued to Stroven et al. on May 21, 1996; U.S. Pat. No. 4,893,039 entitled "Windshield Wiper Motor" which issued to Isii on Jan. 9, 1990; U.S. Pat. No. 4,878,398 entitled "Driving Device for Window Wiper of Motor Vehicles" which issued to Heinrich on Nov. 7, 1989; U.S. Pat. No. 4,336,482 entitled "Rear Window Wiper Motor Control" which issued to Goertler et al. on Jun. 22, 1982; U.S. Pat. No. 4,259,624 entitled "Arrangement for Wiping a Vehicle Window" which issued to Seibicke on Mar. 31, 1981; U.S. Pat. No. 3,694,723 entitled "Motor Vehicle Windshield Wiper Having a Parking Position Outside the Wiper Area" which issued to Schneider et al. on Sep. 26, 1972; and, U.S. Pat. No. 3,665,772 entitled "Windshield Wiper Motor Link Depressed Park Mechanism" which issued to Beard et al. on May 30, 1972.

While it is most favorable to have the maximum area possible cleared on the window, traditional windshield wiper assemblies have failed to achieve full window clearance. Most commonly, vehicle windows are rectangular and the center of rotation of the wiper shaft is below the bottom, or above the top, of the rectangle. The use of this traditional windshield wiper assembly results in portions of the window remaining uncleared due to the attack angle of the blade. This problem is compounded in the liftgate area because the center of rotation of the wiper shaft is typically a more significant distance below the window. When the wipe angle is decreased to smaller values, as in the case of windshield wiper assemblies located in the liftgate area, the uncleared portions of the window become larger.

SUMMARY OF THE INVENTION

In accordance with the present invention, the preferred embodiment of a rocking wiper mechanism employs a wiping blade secured in a rocking wiper bracket, a rotating wiper arm driven by a drive output shaft, and a lost motion element connected to and disposed between the rocking wiper bracket and the rotating wiper arm. The invention finds particular utility for clearing a significant amount of a surface at the relative cost of a single in-plane rocking device as opposed to the cost of a conventional four-bar linkage rocking device creating a similar motion. The invention achieves optimal clearance of the surface by employing the lost motion device to create frictional movement between the wiping blade and the surface being wiped and, simultaneously, allow a rocking motion between the rocking wiper bracket and the rotating wiper arm.

As the drive output shaft actuates the rotational movement of the rotating wiper arm, the connection of the lost motion element with the rocking wiper mechanism permits the rocking wiper bracket to achieve a full 180° wiping motion. The 180° wiping motion compositely encompasses the sweep of the rotating wiper arm plus the total rocking angle of the rocking wiper bracket. Additionally, the connection of the lost motion device with the rocking wiper bracket constrains the degrees of freedom of the rocking wiper mechanism to rotation around an axis defined by a line that is perpendicular to the plane of the surface being cleared.

The rocking wiper mechanism of the present invention is advantageous over traditional windshield wiper assemblies in that the present invention achieves a larger wipe pattern, thereby clearing a significantly greater area of the wiping surface. Additionally, the improved and, more importantly, enlarged wipe pattern is achievable at the cost of a single in-plane rocker. Further, modifications beyond the basic design of the car and the driving motor are not necessary. Modifications are limited to the wiper arm and wiper bracket and can be made at a very low cost. The invention also allows for more remote locations of the drive output.

Additional advantages and features of the present invention will become apparent from the following description and appended claims, taken in conjunction with the accompanying drawings.

BRIEF DESCRIPTION OF THE DRAWINGS

FIG. 2 is a front elevational view showing a wiper arm assembly employed in the preferred embodiment rocking wiper mechanism;

FIG. 3 is a perspective view showing a preferred embodiment of a lost motion device of the rocking wiper mechanism;

FIG. 4 is a perspective view showing a preferred embodiment of a connecting clip of the rocking wiper mechanism;

FIG. 4a is a front elevational view showing the preferred embodiment connecting clip;

FIG. 5 is a perspective view showing a preferred embodiment of the wiper bracket of the rocking wiper mechanism.

DETAILED DESCRIPTION OF THE PREFERRED EMBODIMENT

Figure 1:
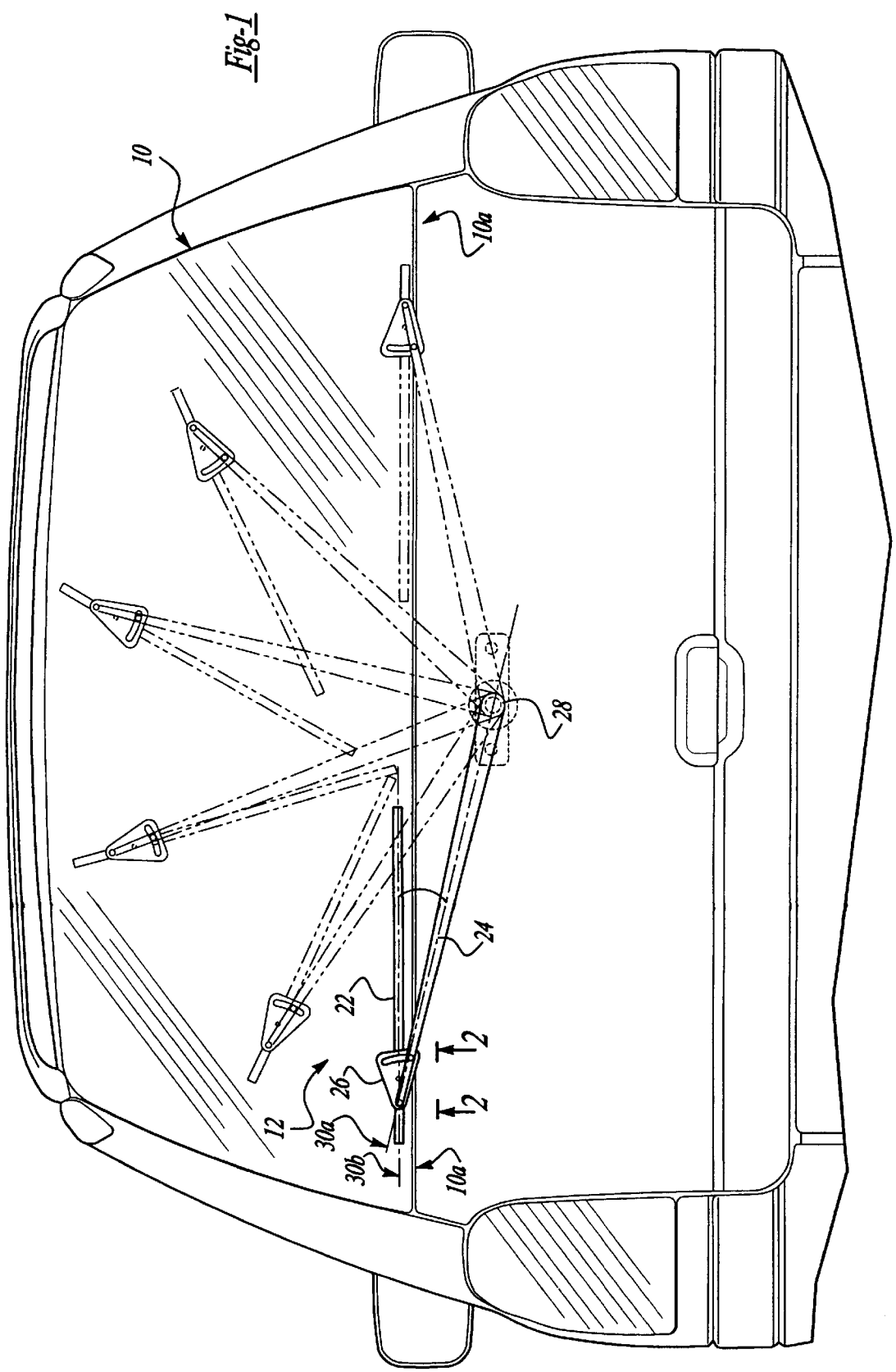
FIG. 1 is a rear elevational view showing a preferred embodiment of a rocking wiper mechanism of the present invention.

Referring to FIG. 1, a vehicle rear window 10 is shown generally. The preferred embodiment of a rocking wiper mechanism 12 is shown in association with vehicle rear window 10. Rocking wiper mechanism 12 primarily includes a rocking wiper bracket 22, a rotating wiper arm 24, a lost motion element 26, and a drive output shaft 28. As drive output shaft 28 causes the movement of rotating wiper arm 24, the connection of lost motion element 26 with rocking wiper bracket 22 allows rocking wiper bracket 22 to freely rotate in a pendulum motion about 180° with a wiping motion that covers a significant percentage of rear window 10. Additionally, this connection constrains the motion of rocking wiper bracket 22 relative to rotating wiper arm 24 in the plane of rear window 10.

Drive output shaft 28 is located below rear window 10. In a resting or parked position, rocking wiper bracket 22 is near, and parallel to, a bottom end 10a of rear window 10. Rotating wiper arm 24 extends from drive output shaft 28 along a first end and connects with rocking wiper bracket 22 along a second end, forming an angle $\theta$, in the rested position, between a centerline 30a of rocking wiper bracket 22 and a centerline 30b of rotating wiper arm 24. As rotating wiper arm 24 moves from its parked position on one side of bottom end 10a to its parked position on the other side of bottom end 10a, angle $\theta$ decreases to 0°, then increases to an inverted angle $\theta$, While it is contemplated that angle $\theta$ be about 22.5°, it should be appreciated that angle $\theta$ may be adjusted, for a particular application, to any angle up to about 30° that would allow full clearance of the window per the application of the present invention.

FIG. 2 illustrates rotating wiper arm 24 and lost motion element 26 combined with a connecting clip 32 to form a wiper arm assembly 40. Lost motion element 26 of wiper arm assembly 40 is pivotally joined to, and disposed between, rotating wiper arm 24 and connecting clip 32 around a commonly shared pivot post 42. Pivot post 42 attaches to rotating wiper arm 24, lost motion element 26 and connecting clip 32 via a riveting technique or any other attachment method that would allow relative movement between rotating wiper arm 24 and lost motion element 26 in the plane of rear window 10. Rotating wiper arm 24 includes a slipping post 44 that extends through an aperture 58 in lost motion element 26. Connecting clip 32 is rigidly secured to lost motion element 26 via a securing pin 46. It should be appreciated that manufacturing wiper arm assembly 40 as a modular unit allows the replacement of wiper bracket 22 and/or its components without the need to replace wiper arm 24 lost motion element 26 or connecting clip 32.

Referring now to FIG. 3, a preferred embodiment of lost motion element 26 is shown, including three apertures: a pivot bore 52, arcuate groove 54 and a securing bore 56. Pivot bore 52 and arcuate groove 54 extend completely through lost motion element 26. Securing bore 56, however, includes a counterbore, or countersink in addition to the bore to allow a smooth interface surface between wiper, arm 24 and lost motion element 26. As wiper arm 24 rotates, and wiper bracket 22 rocks relative to it, lost motion element 26 remains centered on wiper bracket 22, with centerline 30b of rocking wiper bracket 22 defining the midpoint of arcuate groove 54. As wiper bracket 22 leaves its parked position at bottom end 10a of rear window 10, inwardly extending slipping post 44 travels a distance equal to angle $\theta$ within arcuate groove 54 to the midpoint of arcuate groove 54. Slipping post 44 then travels from the midpoint of arcuate groove 54 to the other end of arcuate groove 54 with wiper bracket 22 rocking at a continually increasing lagging angle until the angle between wiper bracket 22 and wiper arm 24 again reaches $\theta$ at the opposite end of rear window 10. The movement of slipping post 44 within arcuate groove 54 allows wiper bracket 22 to rock a maximum angle (2×$\theta$) that takes wiper bracket 22 from bottom end 10a on one side of rear window 10 to bottom end 10a on the other side. It should be appreciated that, while the present invention contemplates the symmetrical use of rocking wiper mechanism 12 relative to drive output shaft 28, a non-symmetrical rocking wiper mechanism may be employed to offset varied drive output situations. As such, angle $\theta$ (as shown in FIG. 3) may not be equal in all situations, depending on the desired angle of rock for a particular application.

While it is further contemplated that lost motion element 26 be triangular in shape and incorporate a pivoting bore and a slotted rocking arc, it should also be appreciated that lost motion element 26 may be designed and constructed in any shape and with any components that would provide a mechanism for limiting the "rock" of rocking wiper bracket 22 relative to rotating wiper arm 24 to a predetermined angle, where the only degree of freedom is rotational in the plane of rear window 10. For example, links or flexures may be functionally substituted for a pivoting bore and post and a slipping arc and post. Accordingly, it should be appreciated that the design and construction of a lost motion device may employ any mechanism that allows the friction between wiper blade and window surface to create an angular variation between the wiper arm and the wiper bracket.

FIGS. 4 and 4a depict connecting clip 32 in varied views. In its preferred embodiment, connecting clip 32 includes first and second side walls 58, 59 and a connecting wall 60. Side walls 58, 59 each have a raised end 58a, 59a, respectively, and a lowered end 58b, 59b, respectively. Clip side wall holes 62, 63 are located on raised ends 58a, 59a, respectively. Connecting wall 60 includes a first hole 72, receiving pivot post 42, and a second hole 66, receiving securing pin 46. While it is contemplated that connecting clip 32 be rigidly attached to lost motion device 26 via securing pin 46, it should be appreciated that, in the alternative, connecting clip 32 may be formed as an integral part of lost motion element 26 in a single component (not shown).

Referring now to FIG. 5, rocking wiper bracket 22 includes first and second sides 78, 79, which are connected by a slotted surface 80, and a blade surface 81. A wiper blade 82 extends from blade surface 81. Rocking wiper bracket 22 further includes inboard and outboard ends 83, 84. Wiper blade 82 extends a substantial length of rocking wiper bracket 22 from inboard end 83 to outboard end 84. Slotted surface 80 includes a slot 85 located substantially towards outboard end 84. Side bracket holes 92, 93 are also located near outboard end 84 on sides 78, 79, respectively.

Figure 6:
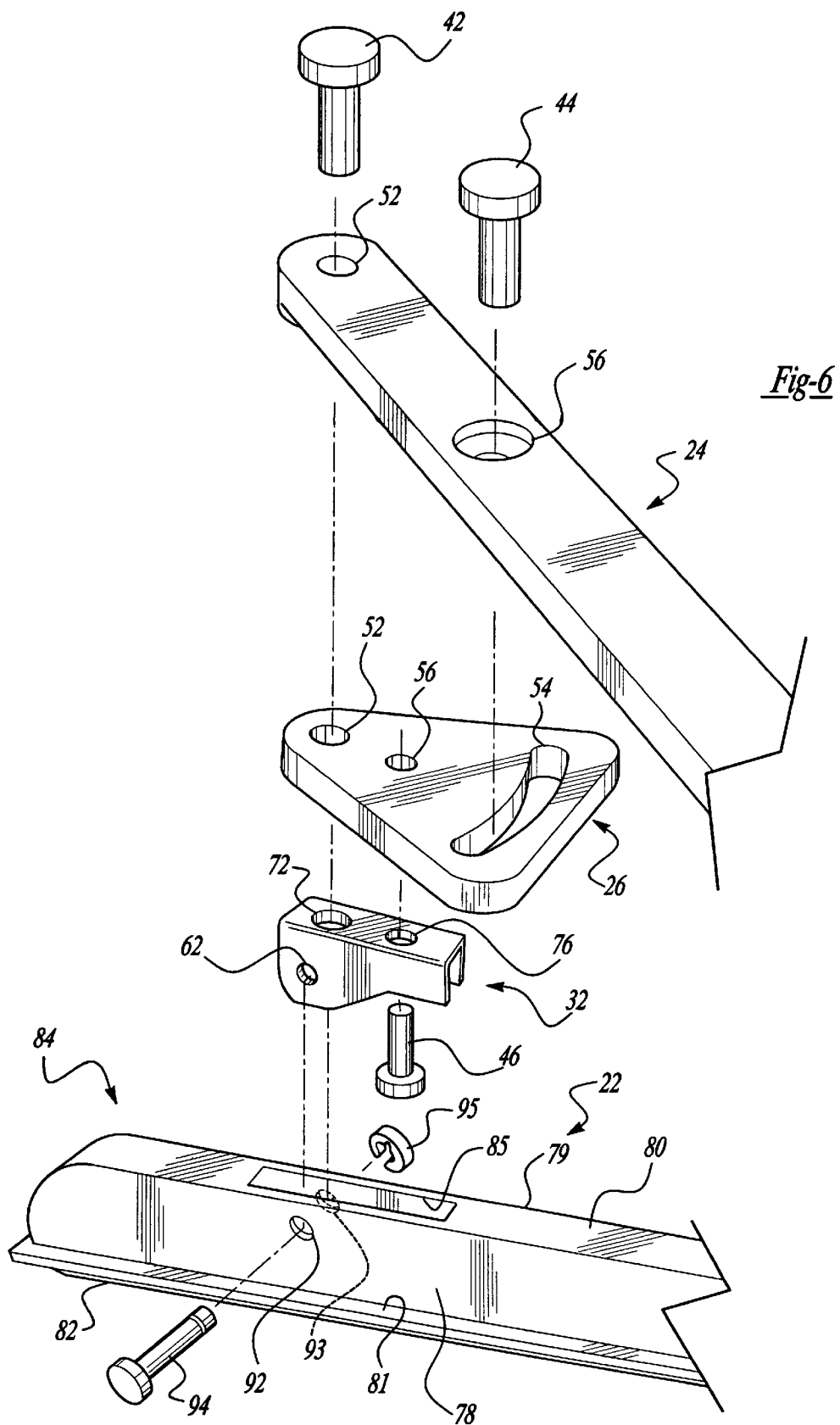
FIG. 6 is an exploded perspective view of the preferred embodiment of the rocking wiper mechanism, in a pre-assembled state.

FIG. 6 illustrates a preferred (exploded view) embodiment of rocking wiper mechanism 12. Rotating wiper arm 24 extends from its connection with drive output shaft 28 and pivotally joins lost motion element 26 via pivot post 42. Lost motion element 26 is pivotally joined to connection clip 32 via pivot post 42 and securely fixed to connection clip 32 via securing pin 46. Raised ends 58b, 59b of connecting clip 32 are received by slot 85 of rocking wiper bracket 22. Clip side wall holes 62, 63 of connecting clip 32 mate with side bracket holes 92, 93 of rocking wiper bracket 22. A connecting pin 94 extends through clip side wall holes 62, 63 and side bracket holes 92, 93 A securing clip 95 attaches to connecting pin 94 and secures connecting clip 32 to rocking wiper bracket 22. Raised ends 58b, 59b of connecting clip 32 allow sufficient distance between slipping post 44 and rocking wiper bracket 22 so that the movement of slipping post 44 through slipping arc 54 is not impeded by rocking wiper bracket 22.

Referring now to FIGS. 1 and 6, rocking wiper bracket 22 has an inner portion, defined by the length of rocking wiper bracket 22 from pivot post 42 towards drive output shaft 28, and an outer portion, defined by the length of rocking wiper bracket 22 from pivot post 42 away from drive output shaft 28. It should be appreciated that a relatively constant friction exists across the entire length of wiper blade 82 between wiper blade 82 and the windshield glass. A significantly greater amount of frictional torque resultant occurs across the inner portion than across the outer portion when consideration is given to the constant friction moment on pivot post 42 across the inner portion versus outer portion. It should be further appreciated that the greater friction on the inner portion causes rocking wiper bracket 22 to rock, in the plane of rear window 10, relative to rotating wiper arm 24. To achieve the aforementioned greater frictional torque on inner portion of rocking wiper bracket 22, rotating wiper arm 24 must be pivotally attached to rocking wiper bracket 22 beyond its frictional center, preferably at about 80% of rocking wiper bracket 22, near outboard end 84. While it is contemplated that the pivotal attachment of rocking wiper bracket 22 to rotating wiper arm 24 is to be preferably located substantially towards outboard end 84 at approximately 80% of rocking wiper bracket 22, it should be appreciated that the pivotal connection may be located at any point beyond the center of rocking wiper bracket 22 so as to always allow a rocking motion of wiper bracket 22 relative to rotating wiper arm 24.

For every application, determinations of moment, friction and torque motor output are calculated relative to pivot post 42. Consequently, consideration should be given to differential speed when locating the pivotal connection between rotating wiper arm 24, lost motion element 26 and connecting clip 32.

It should be appreciated that, while rocking wiper mechanism 12 is directly operable via a solid output from an electric motor, it is also ideally suited for use with a multi-functional electric motor and rear node as disclosed in U.S. Ser. No. 08/430,388 entitled "Multi-Functional Apparatus Employing an Intermittent Motion Mechanism" which was invented by Zimmer et al. and filed on Apr. 28, 1995—and—Ser. No. 08/431,148 entitled "Multi-Functional Apparatus Employing an Electromagnetic Device" which was invented by Maue et al. and filed on Apr. 28, 1995, which are incorporated by reference herein. It should also be appreciated that rocking wiper mechanism 12 can also be used with rear liftgate windows or front windshields.

The components of the present invention may be manufactured from any material that is structurally and/or economically suitable for application in the present invention. It should further be appreciated that any conventional manufacturing techniques may be employed to assemble the components of the present invention.

The foregoing discussion discloses and describes merely an exemplary embodiment of the present invention with a specific example of the best mode currently contemplated by the inventor for practicing the invention. However, it should be realized that the scope of this invention is not limited to this specific example since, in this case, the invention has broad applicability to achieving the significant clearance of windows or other surfaces—not just applicability to the clearance of rain or other visual obstructions from windshields and other glass surfaces of cars, trucks and other land vehicles. One skilled in the art will readily recognize from such discussion, and from accompanying drawings and claims, that various changes, modifications and variations can be made therein without departing from the spirit and scope of the invention as defined in the following claims.

The invention claimed is:

1. A rocking wiper mechanism for a window driven by a motor having an output shaft, said mechanism comprising:
   a swinging wiper arm including a first end connected to said output shaft and a second end;
   a lost motion element having first and second ends, said first end being pivotally attached along the second end of said swinging wiper arm, said lost motion element including an arcuate groove disposed along said second end, a slipping post extending through said wiper arm and into said arcuate groove to limit rotation of said lost motion element on said wiper arm;
   a wiper bracket having a first inbound end and a second outbound end wherein said lost motion element is fixed along said second outbound end of said wiper bracket; and
   a wiping blade attached to said wiper bracket;
      whereby upon activation of the swinging wiper arm, the wiper bracket and attached wiping blade can be freely rotated in a pendulum motion relative to the swinging wiper arm such that a single wiping motion covers a high percentage of the window.

2. The rocking wiper mechanism of claim 1 wherein said lost motion element is substantially flat.

3. The rocking wiper mechanism of claim 1 wherein said first end of said lost motion element is pivotally attached by a pivot post which mates with an aperture provided on said swinging wiper arm.

4. The rocking wiper mechanism of claim 1 wherein movement of said swinging wiper arm in combination with movement of said wiper bracket allows said wiping blade to rotate in a wiping motion up to about 180°.

5. The rocking wiper mechanism of claim 1 wherein said wiper bracket and wiping blade can be rotated up to about 30° relative to said swinging wiper arm.

6. The rocking wiper mechanism of claim 1 further comprises a connection clip disposed between said lost motion element and said wiper bracket.

7. The rocking wiper mechanism of claim 6 wherein said connection clip includes first and second sidewalls and a connected wall extending therebetween.

8. A rocking wiper mechanism for wiping a window driven by a motor having an output shaft, said mechanism comprising:
   a swinging wiper arm including a first end connected to said output shaft and a second end;
   a substantially flat lost motion element having first and second ends, said first end being pivotally attached along the second end of said swinging wiper arm, said lost motion element including an arcuate groove disposed along said second end a slipping post extending through said wiper arm and into said arcuate groove to limit rotation of said lost motion element on said wiper arm;
   a connection clip to which said lost motion element is fixedly attached;
   a wiper bracket having a first inbound end and a second outbound end wherein said lost motion element is fixed along said second end of said wiper bracket; and
   a wiping blade attached to said wiper bracket;
      whereby the rocking wiper bracket and attached wiping blade can be freely rotated in a pendulum motion up to about 30° relative to the swinging wiper arm such that a single wiping motion covers a high percentage of a window.

9. The rocking wiper mechanism of claim 8 wherein said lost motion element is pivotally attached by a pivot post which mates with an aperture provided on said swinging wiper arm.

10. The rocking wiper mechanism of claim 8 wherein movement of said swinging wiper arm in combination with movement of said wiper bracket allows said wiping blade to rotate in a wiping motion up to about 180°.

11. The rocking wiper mechanism of claim 8 wherein said connection clip includes first and second sidewalls and a connected wall extending therebetween.

* * * * *